(12) United States Patent
Moore, Jr.

(10) Patent No.: US 8,663,551 B1
(45) Date of Patent: Mar. 4, 2014

(54) ANIMAL CONTAINMENT FACILITY VENTILATION SYSTEM

(71) Applicant: The United States of America as represented by the Secretary of Agriculture, Washington, DC (US)

(72) Inventor: Philip A. Moore, Jr., Fayetteville, AR (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 13/894,576

(22) Filed: May 15, 2013

(51) Int. Cl.
*A61L 2/18* (2006.01)
*A61L 9/00* (2006.01)

(52) U.S. Cl.
USPC .................. 422/4; 422/5; 422/120; 422/168; 422/169; 422/170; 119/447

(58) Field of Classification Search
USPC ........... 422/4, 5, 120, 168, 169, 170; 119/447
See application file for complete search history.

(56) References Cited

U.S. PATENT DOCUMENTS

| | | | |
|---|---|---|---|
| 3,386,804 A * | 6/1968 | Neugebauer et al. | ......... 423/352 |
| 3,966,450 A | 6/1976 | O'Neill et al. | |
| 5,017,203 A | 5/1991 | Cox et al. | |
| 5,666,905 A | 9/1997 | Mackin et al. | |
| 5,865,143 A | 2/1999 | Moore, Jr. | |
| 5,890,454 A | 4/1999 | Moore, Jr. | |
| 5,961,968 A | 10/1999 | Moore, Jr. | |
| 5,984,993 A * | 11/1999 | Mainz et al. | ...................... 71/12 |
| 6,346,240 B1 | 2/2002 | Moore, Jr. | |
| 6,358,729 B1 | 3/2002 | Ferranti | |
| 7,194,979 B2 | 3/2007 | Moore, Jr. | |
| 8,354,086 B2 * | 1/2013 | Murray et al. | ................ 423/220 |
| 2004/0040516 A1 * | 3/2004 | Jensen | ......................... 119/416 |

FOREIGN PATENT DOCUMENTS

DE 42 33 478 A1 4/1994
WO WO 93/06063 A1 4/1993

\* cited by examiner

*Primary Examiner* — Timothy Vanoy
(74) *Attorney, Agent, or Firm* — John Fado; Robert D. Jones; Lesley Shaw

(57) ABSTRACT

The containment facility ventilation system comprises a two stage scrubber configuration. Exhaust air flows out of an animal containment facility and into a particulate scrubber, which removes particulates and reduces the alkalinity of the exhaust air. The particulate scrubber also reduces the carbon dioxide in the exhaust air. The air then flows into a chemical scrubber which effectively removes ammonia from the exhaust air. The chemical scrubber comprises a potassium bisulfate scrubber solution, and the particulate scrubber comprises a neutral calcium salt scrubber solution.

32 Claims, 5 Drawing Sheets

ANIMAL CONTAINMENT FACILITY VENTILATION SYSTEM

FIELD OF THE INVENTION

The disclosed method and apparatus relates to removing chemicals and dust from air exhausted from an animal containment facility. Specifically, the method and apparatus described herein relates to removing ammonia (among other things) from air exhausted from a poultry rearing facility.

BACKGROUND OF THE INVENTION

The scale of animal production operations continues to expand as a means of increasing the efficiency, consistency, and reliability of the production of animal-related products. As the size of production facilities expand, the importance of providing containment facilities with fresh air and treating the facility's exhausted air also increases. Air exhausted from these facilities has excessive levels of particulate dust (mainly comprising manure) and ammonia gas ($NH_3$).

The prior art includes multiple systems for treating air exhausted from animal containment facilities, including the inventor's previous U.S. Pat. No. 7,194,979 titled METHOD AND DEVICE FOR SCRUBBING AMMONIA FROM AIR EXHAUSTED FROM ANIMAL REARING FACILITIES (hereinafter "Moore '979), which is hereby incorporated by reference. As described in Moore '979, air exhausted from an animal rearing facility is passed through a single stage scrubber where it is brought into contact with a solution comprising a salt of an acidic proton donor. The proton donor solution converts the volatile ammonia from the exhaust gas to non-volatile the ammonium ($NH_3 + H^+ \rightarrow NH_4^+$) and thereby removes the ammonia from the air.

Although the system describe in Moore '979 is very effective, the acidic salts (that comprise the proton donors) described by Moore '979 are problematic. The iron and aluminum salts react with ammonia to form iron and aluminum oxides and hydroxides, which can plug the pipes and cool cell material in the scrubber. Calcium and magnesium proton donors also cause the formation of solids and they lack sufficient acidity to effectively trap the ammonia. Sodium proton donor solutions (particularly sodium bisulfate, $NaHSO_4$) very effectively remove ammonia from the exhausted air, however using the sodium proton donor solution with ammonia results in a scrubber solution that is rich in nitrogen but has extremely high concentrations of sodium. The high concentrations of sodium will eventually cause sodic soil conditions, and thereby limit the long term use of the scrubber solution as a fertiliser.

Strong acids such as hydrochloric, nitric, sulfuric, and phosphoric acids function effectively to remove the ammonia from the exhausted air, however there is a significant safety risk associated with storing, applying, and handling these materials in a farm environment. The strong acids are generally required to balance the alkalinity of the exhausted air.

The need exists for a proton donor solution that effectively reduces ammonia (among other things) from exhausted animal containment facilities without clogging or damaging scrubber components. When the proton donor solution is combined with ammonia, the resulting nitrogen-rich scrubber solution should be usable as an effective fertilizer. The proton donor solution material should also be safe and easy to handle by farm personnel with little or no training. There is also a need for reducing greenhouse gases from the exhausted air, as well as particulates—including manure and bacteria, fungi, and viruses.

The system described herein comprises a two stage exhaust scrubber system wherein the carbon dioxide, particulate matter, and alkalinity of the exhaust air is reduced by a first scrubber, and a second scrubber reduces the amount of ammonia and volatile organic compounds (VOCs) in the exhaust air. The inventor has found that potassium bisulfate ($KHSO_4$) effectively functions as a proton donor scrubber solution to remove ammonia from exhausted animal containment facility air, and neutral salts of calcium (e.g. gypsum in combination with a water) effectively functions to reduce carbon dioxide from the air.

Combining the potassium bisulfate scrubber solution with exhausted ammonia yields a scrubber solution that is rich in nitrogen and potassium and consequently makes an excellent fertilizer. Potassium bisulfate can be stored and handled as a "dry" acid and therefore poses a reduced risk of accident or injury to farm personnel. Combining the neutral calcium salt with carbon dioxide and manure dust yields a scrubber solution that includes the fertilising qualities of manure and is also has a high lime content.

SUMMARY OF THE INVENTION

This disclosure is directed to an exhaust air ventilation system for an animal containment facility. The system comprises a particulate scrubber in series with an ammonia-removing chemical scrubber. The chemical scrubber comprises a potassium bisulfate scrubber solution.

This disclosure is also directed to a method of removing ammonia from the exhaust air from an animal containment facility. In accordance with the method, exhaust air from an animal containment facility is directed through a particulate scrubber and then through an ammonia-removing chemical scrubber. The chemical scrubber comprises a potassium bisulfate scrubber solution.

This disclosure is further directed to a method of making a ventilation system for an animal containment facility. In accordance with the method, a chemical scrubber is provided and potassium bisulfate is circulated through the chemical scrubber. Exhaust air from the animal containment facility is directed through the chemical scrubber so that ammonia is removed from the exhaust air.

This disclosure is additionally directed to an exhaust air ventilation system for an animal containment facility. The system comprises a particulate scrubber wherein the scrubber solution comprises a neutral salt of calcium.

This disclosure is also directed to a method of removing carbon dioxide from the exhaust air from an animal containment facility. In accordance with the method, exhaust air from an animal containment facility is directed through a particulate scrubber wherein the particulate scrubber solution comprises a neutral salt of calcium.

DETAILED DESCRIPTION OF PREFERRED EMBODIMENTS

Figure 1:
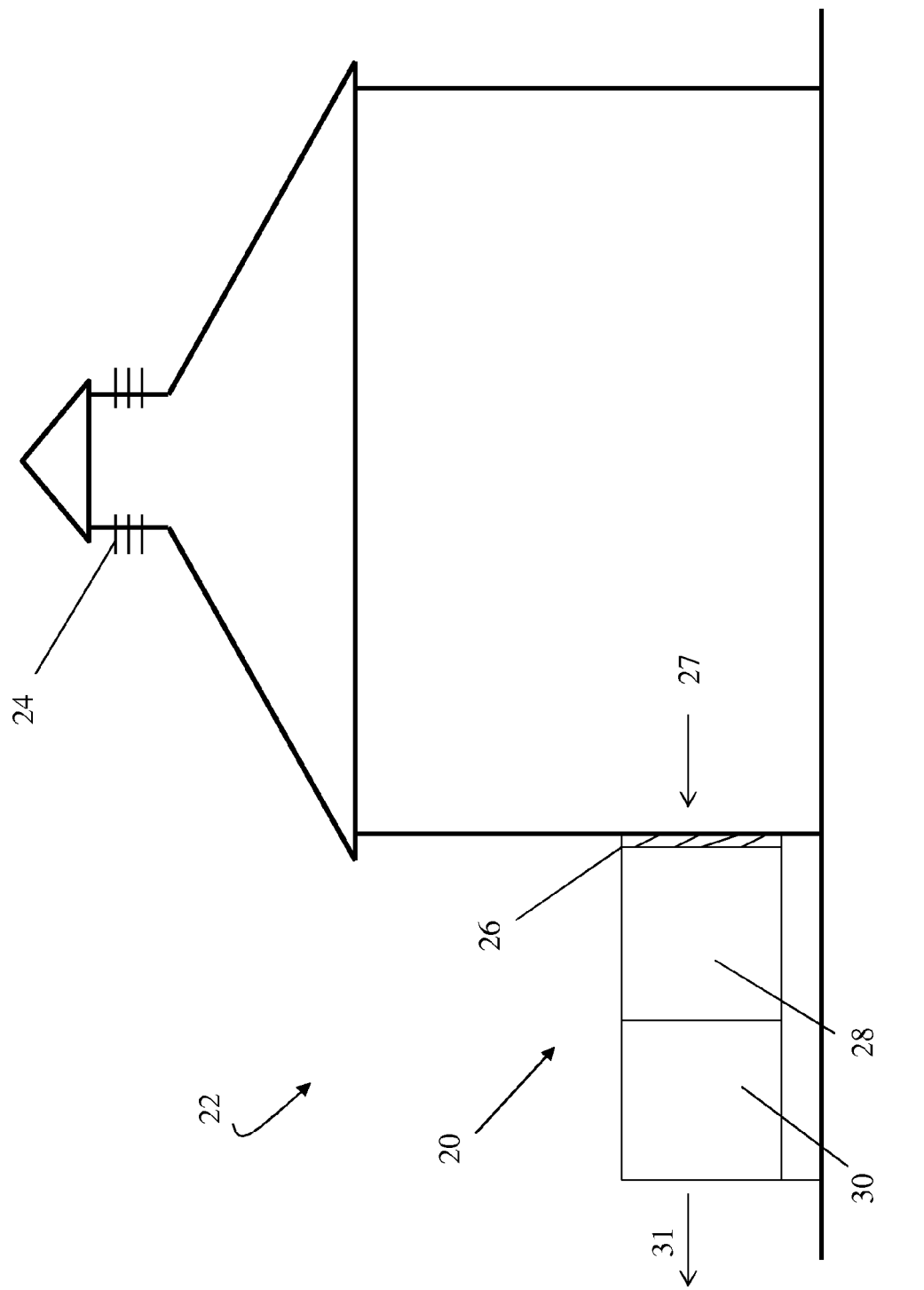
FIG. 1 is a schematic representation of an exemplary animal containment facility which includes a ventilation system as described herein.

As schematically shown in FIG. 1, the method and apparatus described herein comprises an exhaust system 20 for an animal containment facility 22. In the preferred embodiment, the animal containment facility 22 comprises a commercial scale poultry rearing facility. In alternative embodiments the facility 22 may house any type of animal known in the art.

The structure of the animal containment facility 22 is not critical, and the process may be practiced in any conventional facility suitable for containing animals. As generally shown in FIG. 1, air is drawn into the facility 22 through ventilating inlets 24, and exhausted through a ventilation outlet 26 in the direction of the arrow 27, and into an exhaust system 20. The exhaust system 20 comprises a water-based particulate "scrubber" 28, and an acid-based chemical scrubber 30 arranged in series.

In the preferred embodiment, each scrubber 28, 30 is generally structured as described in Moore '979, however essentially any known scrubber may be used. For the purposes of this disclosure, a "scrubber" is defined as an apparatus which brings a liquid "scrubber solution" in contact with a gas so that impurities, contaminants, or other targeted substances are removed from the gas and retained in the scrubber solution. The term "scrubber solution" is defined as the liquid used in a scrubber to remove impurities, contaminants, or other targeted substances from a gas.

In the preferred embodiment, the particulate scrubber 28 removes carbon dioxide as well as dust and other solids from the exhausted air. In a poultry rearing facility, the dust primarily comprises dried manure, however the particulate materials may also include microorganisms such as bacteria, fungi, and viruses, all of which can cause diseases in humans. Even the cell walls of gram negative "dead" bacteria can cause human health problems, because the dead bacteria contain large amounts of endotoxins.

The disease Histoplasmosis is caused by a fungus *Histoplasma capsulatum* and is promoted by "bird droppings". The fungus is frequently found in small amounts in the lungs of human populations that are in close proximity to large poultry-rearing operations. The fungus (and resulting disease) can be dangerous to poultry industry workers who are subjected to large amounts of the fungus over a prolonged period, as well as to environmentally sensitive members of the general public who are exposed smaller amounts of the fungus. Infants, the elderly, and the immunocompromised may be particularly vulnerable. The particulate scrubber 28 described herein is designed to effectively remove essentially all of these organisms from the exhausted air.

In one embodiment, the particulate scrubber 28 solution is essentially water. As the particulate scrubber 28 removes the manure-based dust from the exhausted air, the alkalinity of the exhaust air is significantly reduced. The reduction in alkalinity is critical because the chemical scrubber 30 has an acid-based scrubber solution. Without the reduction in exhaust air alkalinity, the acid-based chemical scrubber 30 solution is prematurely neutralized and becomes ineffective at removing the ammonia from the exhausted air.

In the preferred embodiment, a neutral salt of calcium, such as calcium sulfate, calcium nitrate, or calcium chloride is added to water to create a scrubber solution for the particulate scrubber 28. The calcium sulfate preferably takes the form of conventional (mined) gypsum, fluidized bed combustion (FBC) ash-based gypsum, and/or flue gas desulfurization (FGD) gypsum, or combinations thereof. The FBC and FGD gypsum are generally generated in the context coal-burning systems. Other forms of gypsum may also be used. The neutral salt of calcium (in combination with the water of the scrubber solution) enables the particulate scrubber 28 to effectively scrub carbon dioxide ($CO_2$) from the air. In the preferred embodiment, the neutral salt of calcium should be present in the particulate scrubber solution in a sufficient concentration so that the carbon dioxide level of the exhausted air is effectively reduced. The neutral salt of calcium should be present in amounts greater than trace amounts. In alternative embodiments, the particulate scrubber 28 (having a scrubber solution comprising a neutral salt of calcium) may be used with or without the chemical scrubber 30 described herein.

Under normal conditions, gypsum (or other neutral salts of calcium) alone would not be effective for scrubbing carbon dioxide from the air, primarily because the gypsum is a neutral salt. Typically, a base such as calcium hydroxide or sodium hydroxide, is used as a carbon dioxide trap. However, the alkalinity of the poultry house dust, in combination with high concentrations of ammonia gas passing through the particulate scrubber 28, causes the pH of the particulate scrubber solution to rise to 8-10. At such high pH levels, carbon dioxide molecules that are dissolved in water are converted to bicarbonate ($HCO_3^-$) and carbonate ($CO_3^{2-}$). When the bicarbonate and carbonate ions come into contact with the dissolved calcium ions ($Ca^{2+}$), they form calcium bicarbonate and calcium carbonate, which will then precipitate out—along with the manure dust and other solids produced by the particulate scrubber.

Essentially, the use of a neutral calcium salt not only causes a reduction in greenhouse gas emissions, it also improves the effectiveness of the particulate scrubber solution as a fertilizer. In addition to the (hydrated) manure dust, the resulting particulate scrubber solution will also contain lime (i.e. calcium carbonate and calcium bicarbonate), which comprises a valuable soil amendment and is critical for crop production in some areas.

The acid-based chemical scrubber 30 solution comprises potassium bisulfate in an amount effective to remove the ammonia from the air. In the preferred embodiment, the potassium bisulfate scrubber solution is made by mixing potassium bisulfate dry acid with water. In addition to ammonia, the chemical scrubber 30 described herein also effectively removes 50-95% of the volatile organic compounds (VOCs) that are responsible for the unpleasant odors that are generally associated with commercial poultry-rearing facilities.

The effectiveness of the potassium bisulfate as a scrubber solution is a surprising result. Potassium bisulfate is the potassium salt of bisulfate anion, with the molecular formula $KHSO_4$. Potassium bisulfate is commonly used in the conversion of tartrates to bitartrates in wine. Potassium bisulfate is rarely used in agricultural operations. The potassium bisulfate dry acid used to mix the scrubber solution described herein is not manufactured in industrial quantities in the United States.

The potassium bisulfate used in the chemical scrubber solution should be present in an effective amount. For the purpose of this disclosure, an "effective amount" of potassium bisulfate is greater than a trace amount. An "effective amount" of potassium bisulfate is an amount of potassium bisulfate sufficient to maintain the pH level of the scrubber solution at or below 7, primarily as a result of the presence of the potassium bisulfate in the scrubber solution. In the preferred embodiment, the potassium bisulfate should be present in the scrubber solution in a sufficient concentration so that the pH level of the scrubber solution is maintained at or below 5. The specific amounts/relative quantities of potassium bisulfate required to meet these functional requirements will vary based on the concentration and nature of the ammonia and other chemicals in the exhausted air.

As discussed above, the resulting nitrogen and potassium-rich chemical scrubber solution comprises an excellent fertiliser. After the ammonia is removed from the exhausted air, the air flows out of the chemical scrubber 30 (in the direction of the arrow 31) and into the atmosphere or into further scrubbing/filtering or air handling devices.

In operation, as generally shown in FIG. 1, air is exhausted from an animal containment facility 22 through the ventilation outlet 26 in the direction of the arrow 27 and into a particulate scrubber 28. A neutral calcium salt and water-based particulate scrubber solution removes carbon dioxide, dust, and other solids from the exhaust air and thereby reduces the alkalinity of the exhausted air. The air then moves into a chemical scrubber 30 that includes a potassium bisulfate-based scrubber solution. The chemical scrubber 30 significantly reduces the ammonia in the exhaust air. The air then flows out of the chemical scrubber in the direction of the arrow 31. After the scrubber solutions from the particulate scrubber 28 and the chemical scrubber 30 reach a predetermined chemical threshold, the solutions may be directed to holding areas and subsequently used for fertilisation and irrigation.

The concepts and apparatus described herein are illustrated in the following example:

Example 1

Ammonia removal efficiency of a full scale prototype of the scrubber was determined in tests at the University of Arkansas Poultry Farm in Fayetteville, Ark. The scrubber was connected to a typical 48" variable speed fan used in poultry rearing facilities. Evaluations of each acid were made at 60 and 40 Hz, which corresponded to air flows of roughly 8,000 and 5,000 cfm. Air flow was measured using a fan assessment numeration system device (FANS unit). The amount of pressure drop through the scrubber was measured with a Setra 2601MS1 pressure transmitter. Anhydrous ammonia was metered out into the air in front of the fan at a sufficient rate to result in 25 ppm $NH_3$ going into the scrubber. Ammonia gas concentrations entering and exiting the scrubber were measured every five minutes during the two hour trials using a photoaccustic multigas analyzer (Innova 1412). A tank of 25 ppm $NH_3$ (balance air) was used to test the Innova between each trial.

Three 2-hour trials were conducted with solutions of the following chemicals at both 40 and 60 Hz: alum, aluminum chloride, calcium chloride, ferric sulfate, ferric chloride, sodium bisulfate, potassium bisulfate, sulfuric acid, hydrochloric acid, phosphoric acid, nitric acid and water. The amount of acid (in ml) added to the acid scrubber for sulfuric, hydrochloric, nitric and phosphoric acid was 2000, 5946, 4613 and 1622. This amount of acid was generally sufficient to run 4 of the 6 trials needed for each chemical; after the fourth trial the acid scrubber was cleaned out and fresh acid was added.

The amount of dry acid (in grams) added for the same four trials with alum, calcium chloride, ferrous sulfate, sodium bisulfate and potassium bisulfate was 7137, 3999, 6744, 8652, and 9812. The amount of acid in ml added for liquid aluminum chloride, and liquid ferric chloride was 1164 and 1200 ml, respectively. These acid amounts are roughly equivalent to that provided by 2 L of sulfuric acid. Scrubbing efficiency was calculated by measuring the concentration of $NH_3$ in the scrubber's inflow and exhaust air using the Innova 1412.

In order to measure the mass accumulation of $NH_4$ in the scrubber solution, 20 ml aliquots of the scrubber solution were taken at time 0, 1, and 2 hours from the acid scrubber and analyzed for ammonium colorimetrically using an auto-analyzer. The pH of these samples was also determined. Notes were also recorded on each chemical's ease of use and potential for problems.

Figure 2:
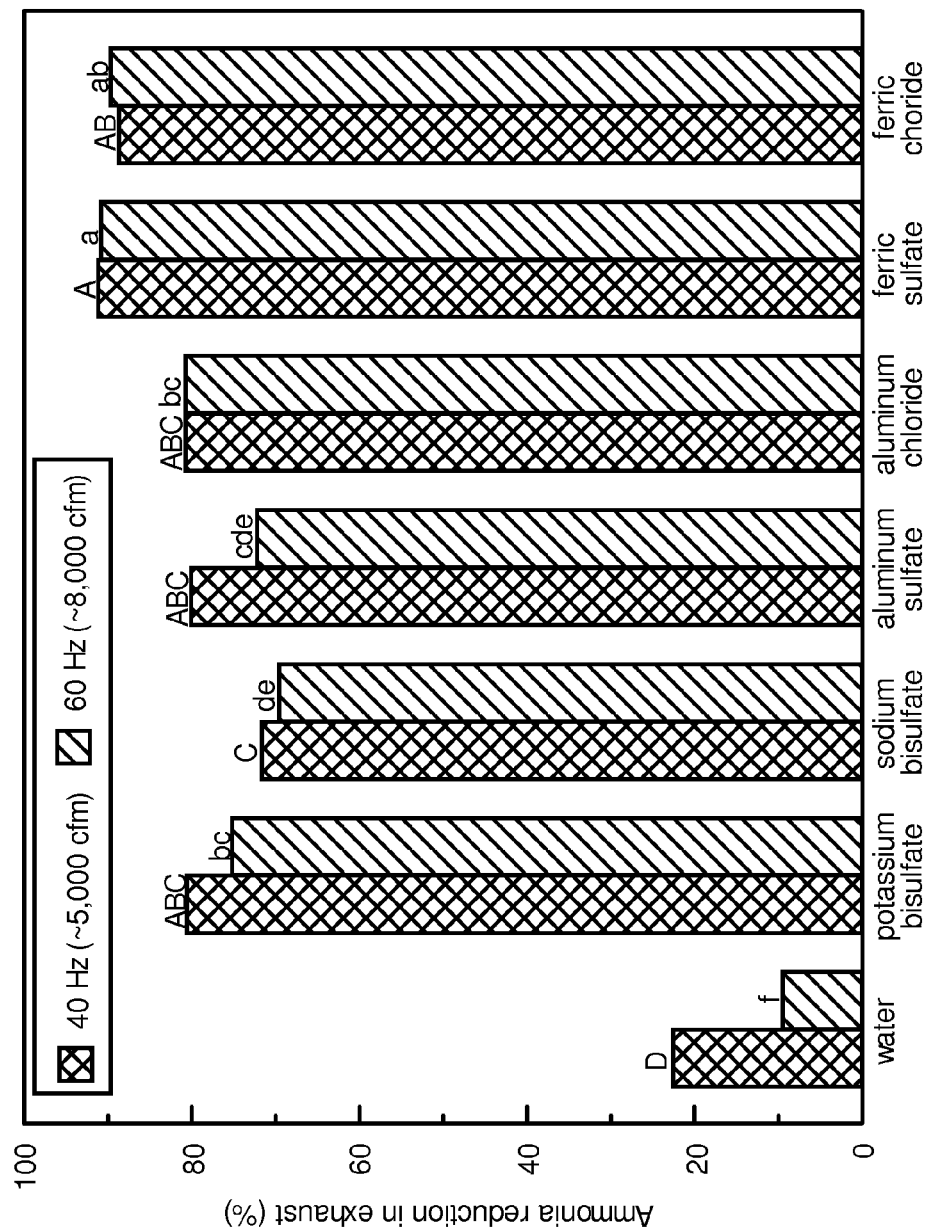
FIG. 2 is a graphical representation of the ammonia reduction in exhaust air with various acid salts and water, as described in Example 1.
Figure 3:
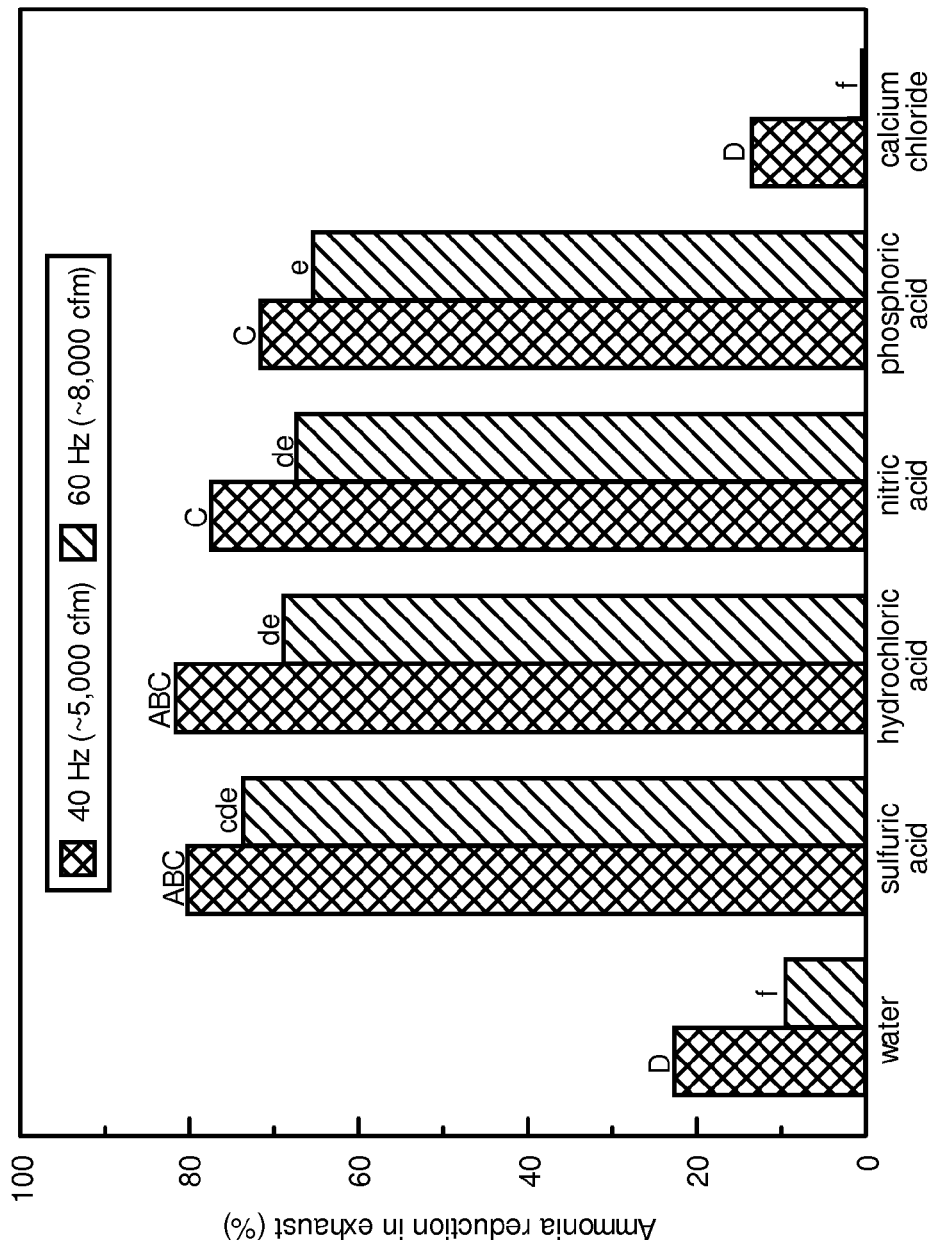
FIG. 3 is a graphical representation of the ammonia reduction in exhaust air with various strong acids, water and calcium chloride, as described in Example 1.

The percent reduction in the exhaust fans is shown in FIGS. 2 and 3. The two Fe compounds (ferric sulfate and ferric chloride) resulted in slightly better reductions in ammonia levels in the exhaust. However, these compounds formed relatively thick layers of Fe oxides and hydroxides on all of the surfaces of the scrubbers in just a few hours. The aluminum compounds (alum and aluminum chloride) resulted in white residue (probably aluminum hydroxide) on the surfaces of the scrubber. Potassium bisulfate worked as well as the Fe and Al compounds at 60 Hz and as well as the Al compounds at 40 Hz and performed slightly better than sodium bisulfate at 60 Hz. Potassium bisulfate also performed better than hydrochloric, nitric and phosphoric acids.

Figure 4:
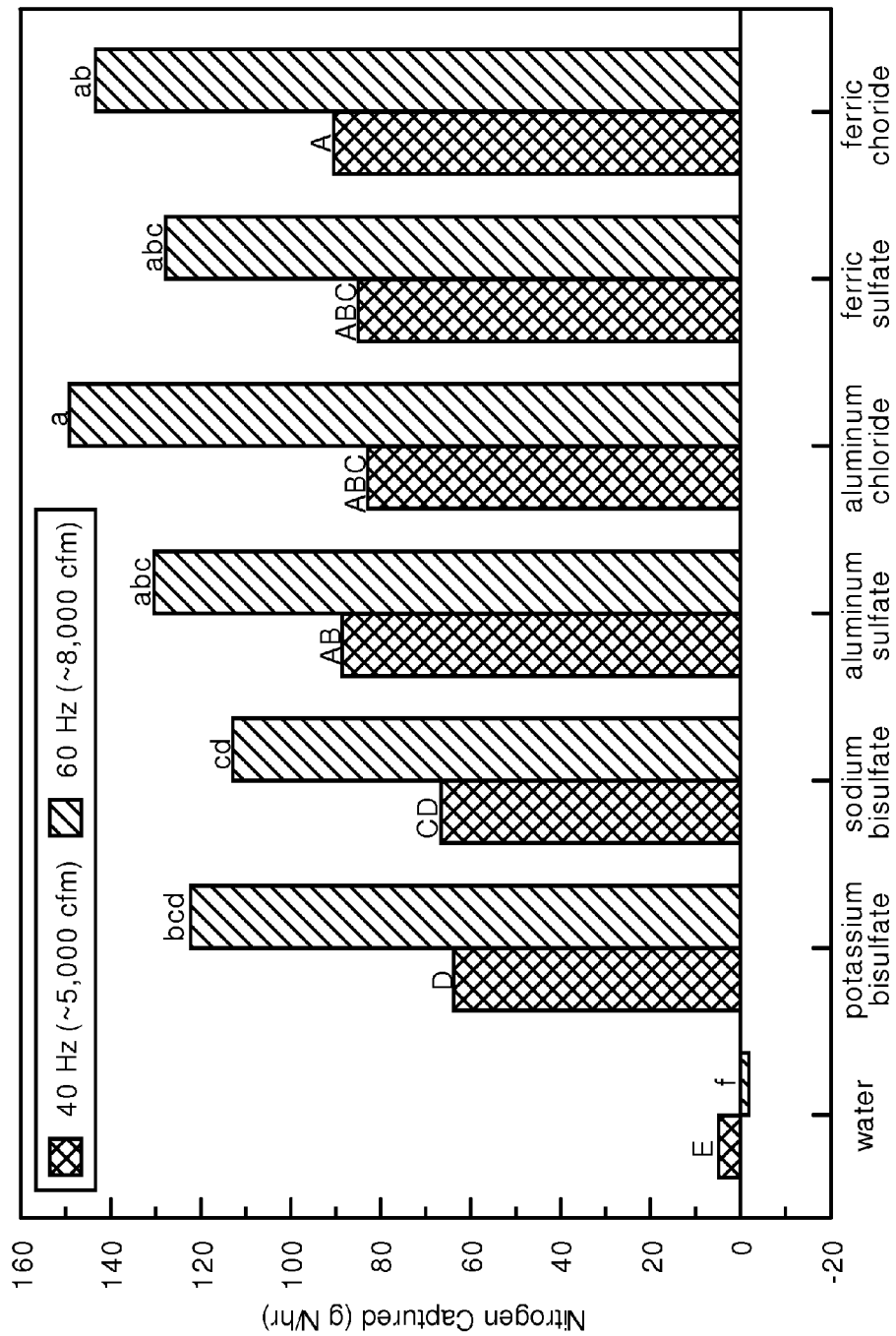
FIG. 4 is a graphical representation of the amount of nitrogen captured per hour with water and various acid salts, as described in Example 1.
Figure 5:
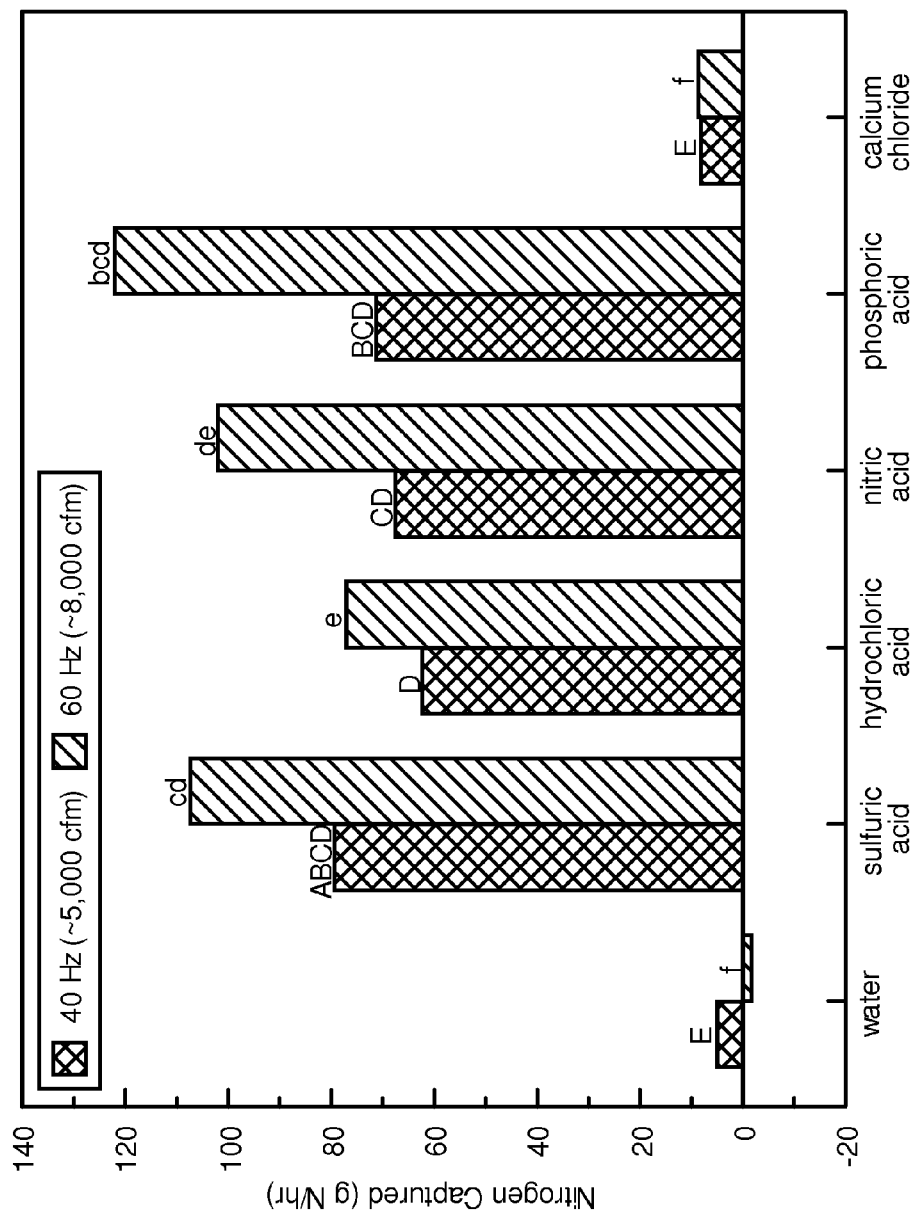
FIG. 5 is a graphical representation of the amount of nitrogen captured per hour with water and various strong acids, as described in Example 1.

The actual amount of nitrogen captured in the scrubber with various compounds is shown in FIGS. 4 and 5. At 60 Hz potassium bisulfate performed as well as all of the strong acids and most of the acid salts, with the exception of aluminum chloride. At 60 Hz the Al and Fe compounds outperformed potassium bisulfate. This may have been due to an increase in surface area on the slats and cool cell material due to Fe and Al compounds on the surface.

There were several problems noted with many of the chemicals tested. For example, some of the dry acids, like alum, did not readily dissolve. And as mentioned earlier all of the Al and Fe compounds resulted in the formation of hydroxides on the surfaces of the scrubber, particularly the cool cell material. While this salt accumulation did not cause an increase in pressure drop during our short test, it is expected that after months or possibly even weeks of use, the salt accumulation would clog up the cool cell material, causing an unacceptable pressure drop, indicating air flow would be hindered. Some of the strong acids (sulfuric acid) caused violent exothermic reactions. Hydrochloric acid caused excessive fuming. Health risks from strong acids are also well known.

For the foregoing reasons, it is clear that the method and apparatus described herein provides an innovative ventilation system for an animal containment facility. The current system may be modified in multiple ways and applied in various technological applications. The disclosed method and apparatus may be modified and customized as required by a specific operation or application, and the individual components may be modified and defined, as required, to achieve the desired result. Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. An exhaust air ventilation system for an animal containment facility comprising an ammonia-removing chemical scrubber, the chemical scrubber comprising a potassium bisulfate scrubber solution.

2. The ventilation system of claim 1 wherein the ventilation system further comprises a particulate removing scrubber.

3. The ventilation system of claim 2 wherein the particulate scrubber comprises a water-based particulate scrubber solution.

4. The ventilation system of claim 3 wherein the water-based particulate scrubber solution further comprises a neutral salt of calcium.

5. The ventilation system of claim 4 wherein the neutral salt of calcium comprises one of calcium sulfate, calcium nitrate, or calcium chloride, or a combination thereof.

6. The ventilation system of claim 4 wherein the neutral salt of calcium comprises calcium sulfate in the form of gypsum.

7. The ventilation system of claim 6 wherein the gypsum comprises one of fluidized bed combustion ash-based gypsum, or flue gas desulfurization gypsum, or combinations thereof.

8. The ventilation system of claim 2 wherein the particulate scrubber effectively removes carbon dioxide and manure-based dust from the exhaust air.

9. The ventilation system of claim 2 wherein the particulate scrubber effectively reduces the alkalinity of the exhaust air.

10. The ventilation system of claim 2 wherein the ventilation system is structured so that the particulate scrubber is in series with the chemical scrubber.

11. The ventilation system of claim 2 wherein the ventilation systems is structured so that exhaust air flows out of the animal containment facility and then through the particulate scrubber, and then to the chemical scrubber.

12. The ventilation system of claim 2 wherein the system is structured so that scrubber solutions from both the particulate scrubber and the chemical scrubber comprise effective fertilisers.

13. The ventilation system of claim 1 wherein the chemical scrubber is structured so that the chemical scrubber solution comprises an effective amount of the potassium bisulfate.

14. The ventilation system of claim 2 wherein the particulate scrubber is structured to remove bacteria, fungi, and viruses.

15. The ventilation system of claim 1 wherein the chemical scrubber is structured so that additional potassium bisulfate is periodically added to the chemical scrubber solution to maintain a chemical scrubber solution pH level at or below 7.

16. A method of removing ammonia from the exhaust air from an animal containment facility, the method comprising the steps of:

(a) directing the exhaust air through a chemical scrubber, wherein the chemical scrubber solution comprises potassium bisulfate.

17. The method of claim 16 wherein before step (a), directing the exhaust air through a particulate scrubber.

18. The method of claim 17 wherein a scrubber solution of the particulate scrubber comprises water.

19. The method of claim 18 wherein the particulate scrubber solution further comprises a neutral salt of calcium.

20. The method of claim 18 wherein the scrubber solution of the particulate scrubber further comprises gypsum.

21. The method of claim 18 wherein the scrubber solution of the particulate scrubber further comprises one of fluidized bed combustion ash-based gypsum, or flue gas desulfurization gypsum, or combinations thereof.

22. The method of claim 17 wherein the particulate scrubber reduces alkalinity and carbon dioxide of the exhaust air.

23. The method of claim 16 wherein additional potassium bisulfate is periodically added to the chemical scrubber solution to maintain a chemical scrubber solution pH level at or below 7.

24. A method of making a ventilation system for an animal containment facility, the method comprising the steps of:

(a) providing a chemical scrubber;
(b) circulating a potassium bisulfate scrubber solution through the chemical scrubber.
(c) directing exhaust air from the animal containment facility through the chemical scrubber so that ammonia is removed from the exhaust air.

25. The method of claim 24 wherein before step (c), directing the exhaust air through a particulate scrubber.

26. The method of claim 25 wherein a scrubber solution of the particulate scrubber comprises water.

27. The method of claim 26 wherein the particulate scrubber solution further comprises a neutral salt of calcium.

28. The method of claim 27 wherein the neutral salt of calcium in the form of calcium sulfate, calcium nitrate, or calcium chloride, in sufficient quantities so that calcium bicarbonate and calcium carbonate or mixtures thereof, are precipitated into the particulate scrubber solution.

29. The method of claim 26 wherein the particulate scrubber solution further comprises gypsum.

30. The method of claim 25 wherein the particulate scrubber reduces alkalinity and carbon dioxide of the exhaust air.

31. The method of claim 24 further comprising:
(d) directing a chemical scrubber solution from the chemical scrubber to an irrigating apparatus to irrigate a crop.

32. The method of claim 25 wherein a scrubber solution from the particulate scrubber is directed to an irrigating apparatus to irrigate a crop.

* * * * *